US008223746B2

(12) United States Patent
Franz et al.

(10) Patent No.: US 8,223,746 B2
(45) Date of Patent: Jul. 17, 2012

(54) MORE ECONOMICAL RESOURCE APPLICATION ON THE USER INTERACTION WITHIN A SPEECH DIALOGUE SYSTEM IN A PACKET NETWORK BY MEANS OF A SIMPLIFYING PROCESSING OF SIGNALLING INFORMATION

(75) Inventors: Mathias Franz, Berlin (DE); Detlev Freund, Berlin (DE); Norbert Löbig, Darmstadt (DE); Johannes Schöpf, Fürstenfeldbruck (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 1115 days.

(21) Appl. No.: 10/561,376

(22) PCT Filed: Jun. 16, 2004

(86) PCT No.: PCT/EP2004/051128
§ 371 (c)(1),
(2), (4) Date: Mar. 7, 2007

(87) PCT Pub. No.: WO2004/112367
PCT Pub. Date: Dec. 23, 2004

(65) Prior Publication Data
US 2007/0141993 A1 Jun. 21, 2007

(30) Foreign Application Priority Data
Jun. 17, 2003 (DE) .................................. 10327290

(51) Int. Cl.
*H04L 12/66* (2006.01)
(52) U.S. Cl. ........................................ 370/352; 370/357
(58) Field of Classification Search ................... 370/352
See application file for complete search history.

(56) References Cited

U.S. PATENT DOCUMENTS 5,838,996 A * 11/1998 deCarmo ......................... 710/68
7,310,675 B2 * 12/2007 Salesky et al. ................. 709/227
2001/0005382 A1 * 6/2001 Cave et al. ..................... 370/466

FOREIGN PATENT DOCUMENTS
EP 1 304 845 A1 4/2003
(Continued)

OTHER PUBLICATIONS
Sip INFO Method for event reporting, Viral Bharatia, Apr. 2002, pp. 1-9.*
(Continued)

*Primary Examiner* — Derrick Ferris
*Assistant Examiner* — Maharishi Khirodhar
(74) *Attorney, Agent, or Firm* — Laurence A. Greenberg; Werner H. Stemer; Ralph E. Locher

(57) ABSTRACT

According to the invention, the type of transmission of signaling information, for a user-interaction with a speech dialogue system in a packet network, is determined with relation to a simplifying processing for DTMF signaling information. A speech dialogue system without special hardware for the processing of DTMF in-band signaling is provided and maintains, during the codec negotiation or the fixing of the coding method for application, that only services with DTMF out-of-band signaling, or signaling by means of dedicated data packets (for example RFC 2833) are carried out by the speech dialogue system. The above may be achieved whereby coding methods with in-band signaling are basically not permitted with relation to the codec negotiation or the control device, controlling the speech dialogue system, is embodied such that, independently of the coding method, out-of-band signaling is always stipulated by the control device. According to a further embodiment, an as a rule smaller-sized speech dialogue system is provided with hardware devices for the processing of DTMF in-band signaling for service requirements, for which out-of-band signaling or signaling by means of dedicated packets cannot be required. The efficiency of information output in packet networks and an economic resource application is thus achieved.

5 Claims, 1 Drawing Sheet

FOREIGN PATENT DOCUMENTS

| | | |
|---|---|---|
| EP | 1 345 399 A1 | 9/2003 |
| WO | WO 03/013116 A1 | 2/2003 |

OTHER PUBLICATIONS

Rtp Payload for DTMF Digits, Telephony Tones and Telephony signals, H.Schulzrinne, May 2000, pp. RFC 2833, pp. 1-29.*

RTP payload for DTMF Digits, Telephony Tones and Telephony signals, H.Schulzinne, May 2000, pp. 1-29, RFC 2833.*

RTP Payload for DTMF Telephony Tones and Telephony signals, H. Schulzrinne, May 2000, RFC 2833, pp. 1-29.*

H.Schulzrinne and S. Petrack, "RTP Payload for DTMF Digits, Telephony Tones and Telephony Signals", RFC 2833, May 2000, pp. 1-30, XP015008616.

Viral Bharatia, Ellis Cave and Bert Culpepper, "SIP INFO Method for Event Reporting", Internet Draft; draft-culpepper-sip-info-event-00.txt, Internet Engineering Task Force, Apr. 18, 2000, p. 1-10, XP002206928.

* cited by examiner

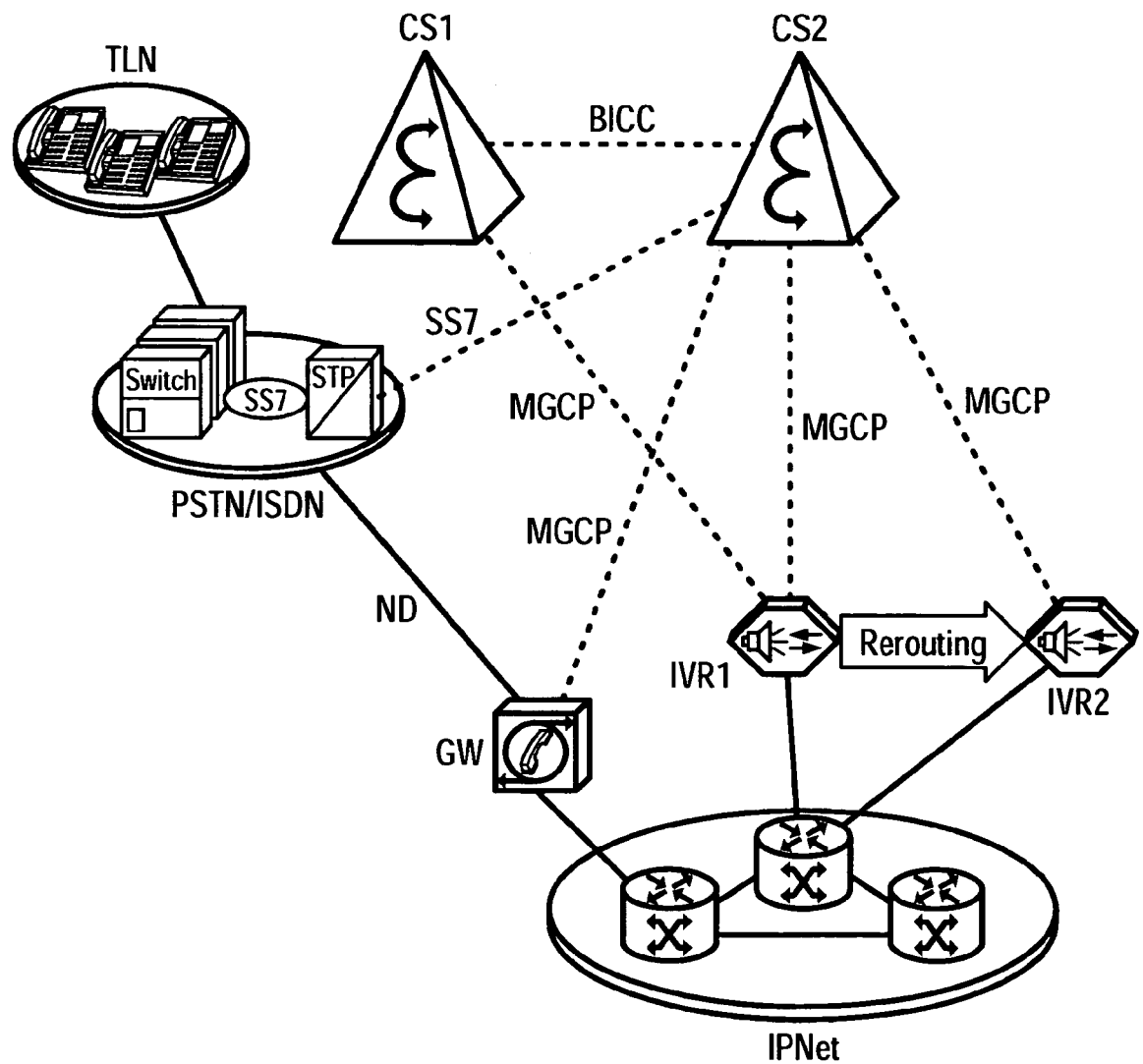

MORE ECONOMICAL RESOURCE APPLICATION ON THE USER INTERACTION WITHIN A SPEECH DIALOGUE SYSTEM IN A PACKET NETWORK BY MEANS OF A SIMPLIFYING PROCESSING OF SIGNALLING INFORMATION

CROSS REFERENCE TO RELATED APPLICATION

This application is the US National Stage of International Application No. PCT/EP2004/051128, filed Jun. 16, 2004 and claims the benefit thereof. The International Application claims the benefits of German Patent application No. 103 27 290.9 DE filed Jun. 17, 2003, both of the applications are incorporated by reference herein in their entirety.

FIELD OF THE INVENTION

The invention relates to methods and devices for a simplifying processing of signaling information during a dialogue with a speech dialogue system in a packet network.

BACKGROUND OF THE INVENTION

One of the most important current developments affecting the fields of network technologies, of call processing, and of Internet technologies, is the realization of services with real-time transmission via packet networks.

At the present moment, most speech transmission is handled via line switched networks—also known as TDM (time division multiplexing) networks. The aim for the future is to transmit a greater amount of speech via packet oriented networks which are currently used mainly for data transmission. Hereby, the so called IP (Internet protocol) networks are the most important class of packet networks. In addition, in future there will be further transmission capacity intensive real-time services, such as, for example, the transmission of video data during a video-on-demand service.

An important class of real-time services is the automated provision of speech or video information. One example of this type of service is given by the recorded announcement services known from TDM networks, e.g. telephone number announcements ("the telephone number of the subscriber is . . . ") or error messages ("the number you are trying to call is not available"). Thereby, automated information output can also contain subscriber specific information (e.g. telephone numbers). Dialogue functionality is an extension of the announcement functionality. There the user can control the service or the dialogue by using the keys in his terminal device or by means of speech input. Servers are used to achieve such kinds of services in packet networks. In the case of interactive services, the term IVR (interactive voice response) server is commonly used. A number of coding methods or codecs (coder-decoder), such as, for example, G.711A/u, G.723.1, G.726, G.728 and G.729A/B were standardized for the transmission of speech. Standards H.261 and H.263, for example, are used for the transmission of video information. For an information output, usually a codec or coding method that is supported by both ends of the network is selected for the information transmission in a so called codec negotiation.

For services with real-time transmission via data networks, it is essential that the service characteristics known from the TDM network be provided for corresponding or new services with comparable quality and efficiency. The optimization of the resource application plays an important part in this.

SUMMARY OF THE INVENTION

The task of the invention is to improve the efficiency of the resource application in the automated information output.

The invention is based on the following consideration. The signaling with relation to an interactive dialogue with a speech dialogue system or an IVR (Interactive Voice Response) server, e.g. for an output of information, is usually carried out using DTMF signals (DTMF: Dual Tone Multiple Frequency). With this signaling—also frequently called tone dialing or dual tone frequency dialing—an interaction between the subscriber and the speech dialogue system is realized by means of an exchange of coded information through frequencies. Three scenarios can be distinguished in the transmission of DMFT signals via a packet network:

The DTMF signals are contained in the payload stream. In this connection, one also talks about in-band transmission. In-band transmission is only used in conjunction with non-compressing coding methods or codecs such as, for example, G.711.

DTMF signals and payload are transmitted separately, i.e. out-of-band transmission of DTMF signaling information is carried out.

The DTMF signals are transmitted in the payload stream in separately labeled data packets. A transmission of this type was standardized by the IETF in the Request for Comments RFC 2833 for the RTP (real-time protocol) packet format.

With in-band transmission of DTMF signals, usually special hardware resources, for example, designed with DSPs (DSP: digital signaling processor) or ASICs (ASIC: Application specific integrated circuit) are required in the speech dialogue system or the IVR server for the analysis of the DTMF signals. With relation to the invention, in-band transmission of DTMF signals is largely avoided and the use of speech dialogue systems or IVR servers without hardware resources for the recognition of DTMF signaling is proposed.

The coding method and the type of exchange of DTMF signals for an automated information output is usually determined during a so called codec negotiation between packet network terminals. The first packet network terminal is represented, for example, by a network interface device or a media gateway or by a packet based terminal linked directly to the packet network. The second packet network terminal is the speech dialogue system. In the codec negotiation a codec supported by both terminals and by the network is selected from a list of codecs. Usually, when a codec is selected, by default or by presetting, the type of transmission of the DTMF signals is also determined, e.g. the selection of the coding method G.711 is linked to in-band transmission of the DTMF signals. With relation to the invention, two methods will be shown to exclude in-band transmission:

In the first method, only out-of-band-signaling or signaling by means of specially labeled data packets is permitted in the codec negotiation. Coding methods that involve an in-band signaling of DTMF signals are practically eliminated from the list of applicable codecs during the codec negotiation.

The second method includes an extension of the logic of the control device controlling the speech dialogue system. The control device (e.g. a packet based exchange, a call server, a proxy server or a soft switch) is embodied such that said control device signals to the remote packet network terminal involved in the codec negotiation to use out-of-bandsignaling of DTMF signals independently of the selected codec. In this case, as a rule the codec G.711 can also be selected.

The invention has the advantage that speech dialogue systems can be used without complex hardware resources. In principle, for services with user interaction or automated information output, it is then also possible to use so called general purpose platforms, that is multi-function computers with open interfaces that provide the desired IVR or information output resources through their software tools. The provision of dedicated hardware is no longer necessary.

According to a further embodiment—as a backup so to speak—provision is made for the rerouting of the job to a speech dialogue system with dedicated hardware for those cases where the in-band signaling of DTMF signals cannot be achieved with the above procedure. That would be the case in the first method if no codec supported by the two packet network terminals can be identified with out-of-band signaling and there is also no provision for signaling by means of a packet specifically provided for DTMF signals. In this case, according to the further embodiment, the service is switched to a speech dialogue system with dedicated hardware. With the second method, in the course of which, a control device stipulates out-of-band-signaling for the first packet network terminal independently of the codec selected, it is possible to forward the call to the speech dialogue system with hardware for DTMF signal recognition if the necessary resources or technical support for the out-of-band transmission are not available.

The further embodiment allows a service to be dealt with also in cases where it is not possible to carry out a service with the speech dialogue system without special hardware. Otherwise, service requirements of that type would have to be refused. As a rule, however, it will be possible to provide the service through the speech dialogue system without special hardware. Therefore, the provision of one backup speech dialogue system will be sufficient for a large number of speech dialogue system without special hardware. Alternatively, the speech dialogue system with special hardware can be assigned only to one speech dialogue system without dedicated hardware, whereby the speech dialogue system without special hardware is accordingly more powerfully sized, i.e. with respect to the available resources it is designed for the processing of a lot more service requirements per time unit than the other speech dialogue system.

BRIEF DESCRIPTION OF THE DRAWING

In the following, the subject of the invention will be described in more detail below with reference to an embodiment using a FIGURE.

FIG. 1 is an illustration of the preferred embodiment of the invention.

DETAILED DESCRIPTION OF THE INVENTION

There are two IVR servers, IVR1 and IVR2, represented in the FIGURE, with the first IVR server IVR1 having no special hardware for the processing of DTMF signals, the second IVR server, however, does. Subscribers TLN are represented that are connected to a TDM network PSTN/ISDN. Voice communications of the subscriber TLN can be switched via a switching system switch. The TDM network ISDN/PSTN is connected with an IP network IPNet by means of a media gateway GW. Here, this is, for example, a core network. Within the IP network IPNet, signaling information and payload ND are routed separately. Signaling information coming from the TDM network IDSN/PSTN is transferred via a so called signaling transfer point STP to a call server CS2. Signaling is carried out with the help of signals of the SS7 signaling system. Using the MGCP protocol (Media gateway Control Protocol), the call server CS2 exchanges signaling information with the gateway GW and the speech dialogue systems IVR1 and IVR2. The H.248 protocol could also be used instead of the MGCP protocol. With the help of the MGCP (Media gateway Control Protocol) protocol, the call server CS1 can also control the speech dialogue system IVR1.

According to the invention, the selection of a codecs is carried out in the course of an interactive dialogue with a subscriber TLN as follows:

With relation to the codec negotiation, a type of DTMF signaling without in-band signaling is required through the selection of the coding method, which DTMF signaling occurs in the packet network by means of signaling between the IP terminals and the call server CS2. This procedure executes in such a way that the A-side IP terminal, represented by the gateway GW, signals a prioritized list of voice codecs, fax and tone capabilities to the call server CS2 during the call set-up. In compliance with administrable defaults, the call server CS2 can delete from the list the voice codecs/capabilities that should not be used in the network, or said call server can change the priorities. The modified list is delivered to the B-side IP terminal, in this case the speech dialogue system IVR1. This system compares the list received via the signaling list with its own list and eliminates the voice codecs/capabilities that are not contained in both lists. The list thus checked and possibly modified is signaled back to the A-side IP terminal via the call server CS2, and sets the selection of voice codecs/capabilities that are to be used.

During the codec negotiation the speech dialogue system IVR1 only offers the signaling to RFC2833 and compressing voice codecs, which do not permit an in-band DTMF signaling and therefore inevitably result in a DTMF out-of-band signaling. That means that in special the usually used, but DTMF transparent regression coders (e.g. G.711) are not contained in the codec list signaled back by the IVR. The demand for the DTMF out-of-band signaling is made by the call server CS2 by means of signaling to the A-side IP terminal. To this end the call server CS2 has a logic that checks the voice codec negotiated by the codec negotiation. If this is a compressing voice codec (e.g. G.723), the call server signals the DTMF out-of-band transmission to the A-side IP terminal.

There is a peripheral device with virtual announcement and/or dialogue ports in the call server CS2. The speech dialogue system IVR1 and possibly also the speech dialogue system IVR2 are controlled via said peripheral device. This peripheral device with virtual announcement and/or dialogue ports converts the seizures of its ports by the call server CS2 into seizure signaling of the allocated ports leading to the speech dialogue systems. This peripheral device also outputs the jobs to play announcements and dialogues towards the speech dialogue systems. Acknowledgements from the speech dialogue systems IVR1 or IVR2 indicating the end of the announcement or containing the input of the end user ensue at the assigned peripheral device with virtual announcement and/or dialogue port. All the signaling between the peripheral device responsible for the virtual announcement and/or dialogue port and the assigned external speech dialogue systems IVR1 or IVR2 ensues via the signaling protocol MGCP that is used to access the media gateway MG.

For the case that the A-side IP terminal does not support any of the voice codecs offered by the IVR1 that lead to DTMF out-of-band signaling, or RFC2833, the service requirement is automatically rerouted or forwarded to an alternative speech dialogue system IVR2 that also supports the voice codecs with in-band DTMF signaling. Since, as a rule, there is only a small number of IP terminals that exclusively support voice codecs with in-band DTMF signaling, the channel number of the speech dialogue system IVR2 can be substantially smaller than that of the speech dialogue system IVR1, thus achieving an optimization of costs for the overall IVR functionality to be made available.

The codec negotiation that takes place during the call set-up is used as a trigger event for the rerouting of the speech dialogue system IVR1 to the speech dialogue system IVR2. The speech dialogue system IVR1 determines on the basis of the codec negotiation that there is no match between the voice codecs of the A-side IP terminal and of the speech dialogue system IVR1, and signals a corresponding error (e.g. error code 543 "Codec Negotiation Error") to the peripheral device with virtual announcement and/or dialogue port in the call server. The peripheral device evaluates this error and, by means of the data link control in the call server, initiates thereupon a removal of the connection to the speech dialogue system IVR1, followed by a setting up of the connection to the speech dialogue system IVR2. The connection to the A-side IP terminal is maintained during this rerouting procedure. The addresses of the speech dialogue systems IVR1 and IVR2 are administered in the database of the call server CS2.

It is also conceivable that the speech dialogue system with special hardware IVR2 is controlled by a different call server from the call server CS2, e.g. by the call server CS1. In this case, the rerouting from the speech dialogue system IVR1 to the speech dialogue system IVR2 can be achieved by exchanging appropriate signaling information between the two call servers CS2 and CS1 e.g. by means of the BICC (Bearer Independent Call Control) protocol.

An alternative procedure is based on the extension of the logic in the call server CS2 to require the DTMF out-of-band signaling. This extension is that the logic checks whether the B-side IP terminal is the speech dialogue system IVR. In this case the speech dialogue system IVR1 also offers the non-compressing voice codecs, and the call server CS2, independently of the selected voice codec, always signals DTMF out-of-band transmission to the A-side IP terminal.

The invention claimed is:

1. A method for determining the type of transmission of signaling information between a first packet network terminal and a speech dialogue system, for simplifying the processing of the signaling information with relation to a dialogue with a speech dialogue system in a packet network, comprising:
   providing a first speech dialogue system, the first speech dialogue system having no special hardware for the support of in-band signaling;
   specifying the first speech dialogue system as the speech dialogue system;
   determining a codec supported by both the first packet network terminal and the speech dialogue system for the transmission of signaling information;
   controlling the speech dialogue system by a control device that, independently of the selected codec, sends a signaling message to the first packet network terminal and that message stipulates the use of out-of-band signaling; and
   in the case that the first packet network terminal does not permit out-of-band signaling for codecs supported by both the first packet network terminal and the first speech dialogue system:
      specifying a second speech dialogue system supporting in-band signaling as the speech dialogue system instead of the first speech dialogue system; and
      determining a coding method with in-band signaling for the transmission of the signaling information between the first packet terminal and the second speech dialogue system.

2. The method according to claim 1, wherein, with relation to a codec negotiation/determination, a codec is selected that is supported by both packet network terminals.

3. The method according to claim 1, wherein the transmission of signaling information with relation to an automated information output is carried out by Dual Tone Multiple Frequency characters.

4. The method according to claim 1, wherein the speech dialogue system is controlled by a control device that is represented by a packet based exchange, a call server, a proxy server, or a soft switch.

5. The method according to claim 1, wherein with relation to the dialogue with the speech dialogue system, an automatic output of information, speech information, video information, or both is undertaken.

* * * * *